US006097012A

United States Patent [19]
Shiozuka

[11] Patent Number: 6,097,012
[45] Date of Patent: Aug. 1, 2000

[54] INDUCTION-HEATING BENDER

[75] Inventor: Kazuo Shiozuka, Toyama-ken, Japan

[73] Assignee: Hajime Yoshida, Fukushima-ken, Japan

[21] Appl. No.: 09/175,535

[22] Filed: Oct. 20, 1998

[30] Foreign Application Priority Data

Jan. 14, 1998 [JP] Japan .................................. 10-005432
Jan. 30, 1998 [JP] Japan .................................. 10-18988

[51] Int. Cl.[7] .................................. H05B 6/10
[52] U.S. Cl. .......................... 219/602; 219/635; 219/659; 72/12
[58] Field of Search .................................. 219/600, 601, 219/602, 635, 636, 637, 640, 642, 645, 647, 659, 676, 677; 72/12, 30, 128, 217, 369

[56] References Cited

U.S. PATENT DOCUMENTS 3,762,196 10/1973 Kempken .................................. 72/12
3,835,687 9/1974 Kubota et al. .................................. 72/369
4,061,005 12/1977 Kawanami et al. .................................. 72/30
4,254,649 3/1981 Cervenka et al. .................................. 72/128
4,412,442 11/1983 Kawanami et al. .................................. 72/128
5,390,522 2/1995 Dircks .................................. 72/217

*Primary Examiner*—Tu Ba Hoang
*Attorney, Agent, or Firm*—Arent Fox Kintner Plotkin & Kahn, PLLC

[57] ABSTRACT

Disclosed is an improved induction-heating bender comprising: conveyor means for feeding a workpiece to be bent; a pivot arm having a gripper rotatably fixed at its free end for gripping the workpiece, permitting the gripper to be set at a selected angle relative to the axial line of the pivot arm; an arm support for rotatably holding the pivot arm and for carrying the same toward the workpiece, permitting the pivot arm to be set at a controlled effective pivot-to-gripper distance; and a heating-and-cooling mechanism for induction-heating and softening the workpiece and for cooling the same. The pivot arm has its axial line offset from its pivot. The gripper can be rotatably adjusted in angular position relative to the axis of the pivot arm, thereby permitting the workpiece to be smoothly bent into the spiral or elliptical form. The heating-and-cooling mechanism comprises a plurality of cool compartments for effecting different hardenings for selected parts of workpiece.

8 Claims, 7 Drawing Sheets

10 12 12 43 40 21 41 25 M 11 12 23 20 31 30 33 I 37a A-B 37 36 37a 32 32 34 35 M

FIG. 6a
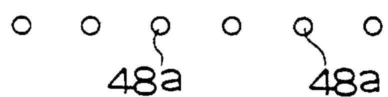
FIG. 6b
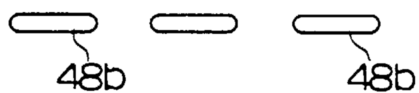
FIG. 6c
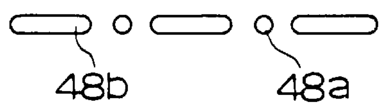
FIG. 6d
48a 48b
FIG. 7
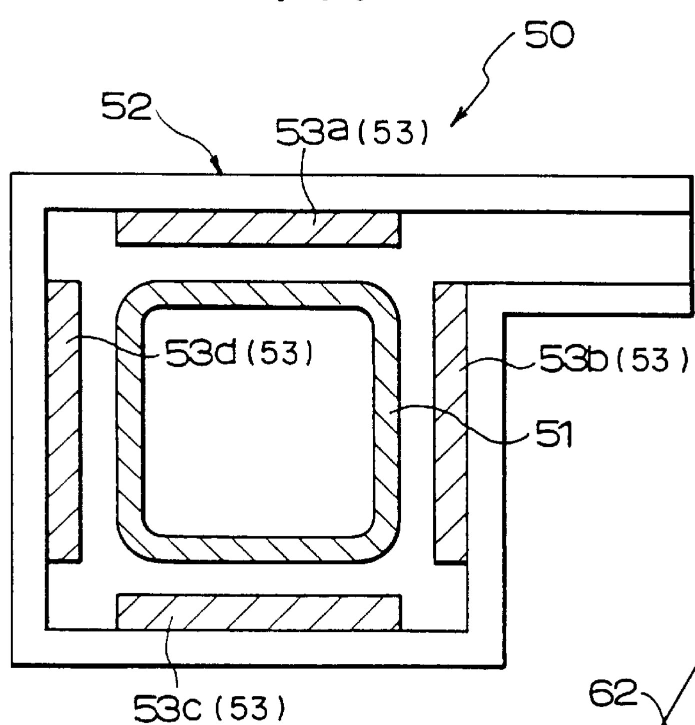
FIG. 8
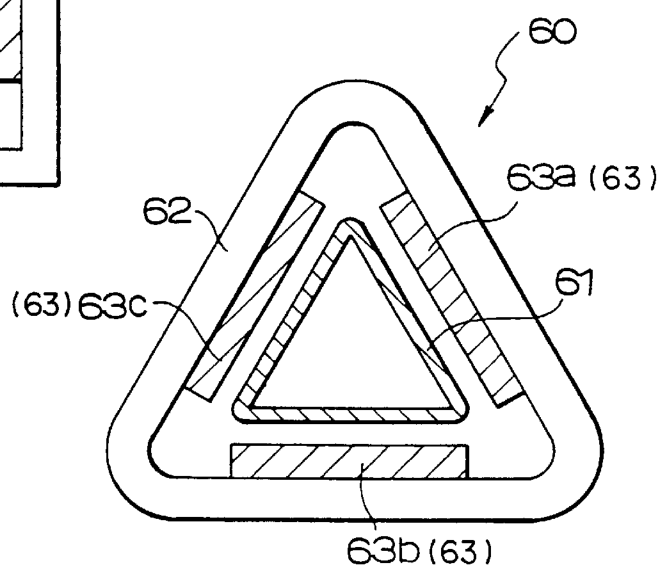

INDUCTION-HEATING BENDER

BACKGROUND OF THE INVENTION

1. Field of the Invention

The present invention relates to an improvement in or relating to an induction-heating bender which can bend metal workpieces of different cross-sections while being induction-heated.

2. Description of Related Art

A conventional induction-heating bender comprises a pivot arm for holding a metal workpiece to be bent and an induction-heater in the form of high-frequency coils, which are adapted to encircle the metal workpiece. The metal workpiece is heated and softened, so that it may be bent by applying a bending forth to its end with the pivot arm. In case that selected sections of an elongated beam-like workpiece are bent sequentially to provide different curvatures thereover the effective radial length of the pivot arm is changed for each selected section. The induction-heater has coolant nozzles formed on the inner surface of the induction coil. Thus, required cooling is effected at same temperature irrespective of which parts of the metal workpiece being subjected to compression or stretch.

The conventional induction-heating bender can bend beautifully a beam-like metal workpiece at same curvature. An elliptical bending or spiral bending, however, cannot be beautifully performed; transitions between different curvatures show unpleasing appearance.

The cooling at same temperature irrespective of which parts of the workpiece are compressed or stretched is likely to cause wrinkles or ridge-like projections to appear on the metal workpiece, such as an H-crosssectioned steel as seen from FIG. 13. Also, disadvantageously a noticeable amount of stress remains in a certain workpiece of large cross-sectional coefficient such as an H-crosssectioned steel. Such a metal workpiece cannot be bent with precision, and the so bent article has poor mechanical characteristics.

SUMMARY OF THE INVENTION

One object of the present invention is to provide an improved induction-heating bender which can provide elliptical- or spiral-bent workpieces of pleasing appearance, free of wrinkles or unpleasing irregularities.

To attain this object an induction-heating bender according to the present invention comprises: means for feeding a workpiece to be bent; a pivot arm having a gripper rotatably fixed at its free end for gripping the workpiece to be bent, permitting the gripper to be set at a predetermined angle relative to the axial line of the pivot arm; an arm support for rotatably holding the pivot arm and for carrying the same toward the workpiece to be bent, permitting the pivot arm to be set at a controlled effective pivot-to-gripper distance; and heating-and-cooling mechanism for induction-heating and softening the workpiece to be bent and for cooling the same.

The so constructed induction-heating bender can bend a workpiece with continuous transitions between different curvatures in an elliptical or spiral form.

The pivot arm may have its axial line displaced from its pivot. With this arrangement the localizing of stress to the point at which a workpiece is made to start bending can be avoided by displacing the starting position apart from the end of the feeding mechanism, thereby assuring that each curved section can be continuous to the preceding one.

The gripper may have manual chuck means equipped therewith, thereby permitting users to perform the gripping of a workpiece quickly.

The gripper may have hydraulic or power-driven chuck means equipped therewith, thereby permitting the gripping of a workpiece with an increased force.

The heating-and-cooling mechanism may comprise a heating coil encircling the workpiece to be bent and a plurality of cool compartments placed inside of the heating coil.

The heating-and-cooling mechanism may comprise means for controlling the temperatures of the plurality of cool compartments independently.

With this arrangement a workpiece can be bent while being subjected to so controlled heating and cooling conditions that no wrinkles may be caused in the curved surfaces of the workpiece, no matter what cross-sectional shape it may have, such as an "H"-steel, a circular pipe, a square pipe or a triangular pipe. Also, the workpiece can be cooled at selected places, and accordingly it can be so hardened or annealed at its selected places that the degree of hardness or tenacity may be controlled, and that the remaining stress may be removed from the curved part to meet particular requirements in different applications. The temperature of coolant ejecting from each cool compartment can be controlled independently, and water, oil or compressed air may be selectively used as a coolant in each cool compartment.

Each of the cool compartments may comprise two separate sections adjoining in the direction in which the workpiece is to be fed.

Other objects and advantages of the present invention will be understood from the following description of an induction-heating bender according to a preferred embodiment of the present invention, which is shown in accompanying drawings.

BRIEF DESCRIPTION OF THE DRAWINGS

FIGS. 6(A) to (D) show different patterns of coolant slots in the heating-and-cooling mechanism of the bender;

FIG. 7 is a sectional view of another example of heating-and-cooling mechanism;

FIG. 8 is a sectional view of still another example of heating-and-cooling mechanism;

DESCRIPTION OF THE PREFERRED EMBODIMENTS

Figure 1:
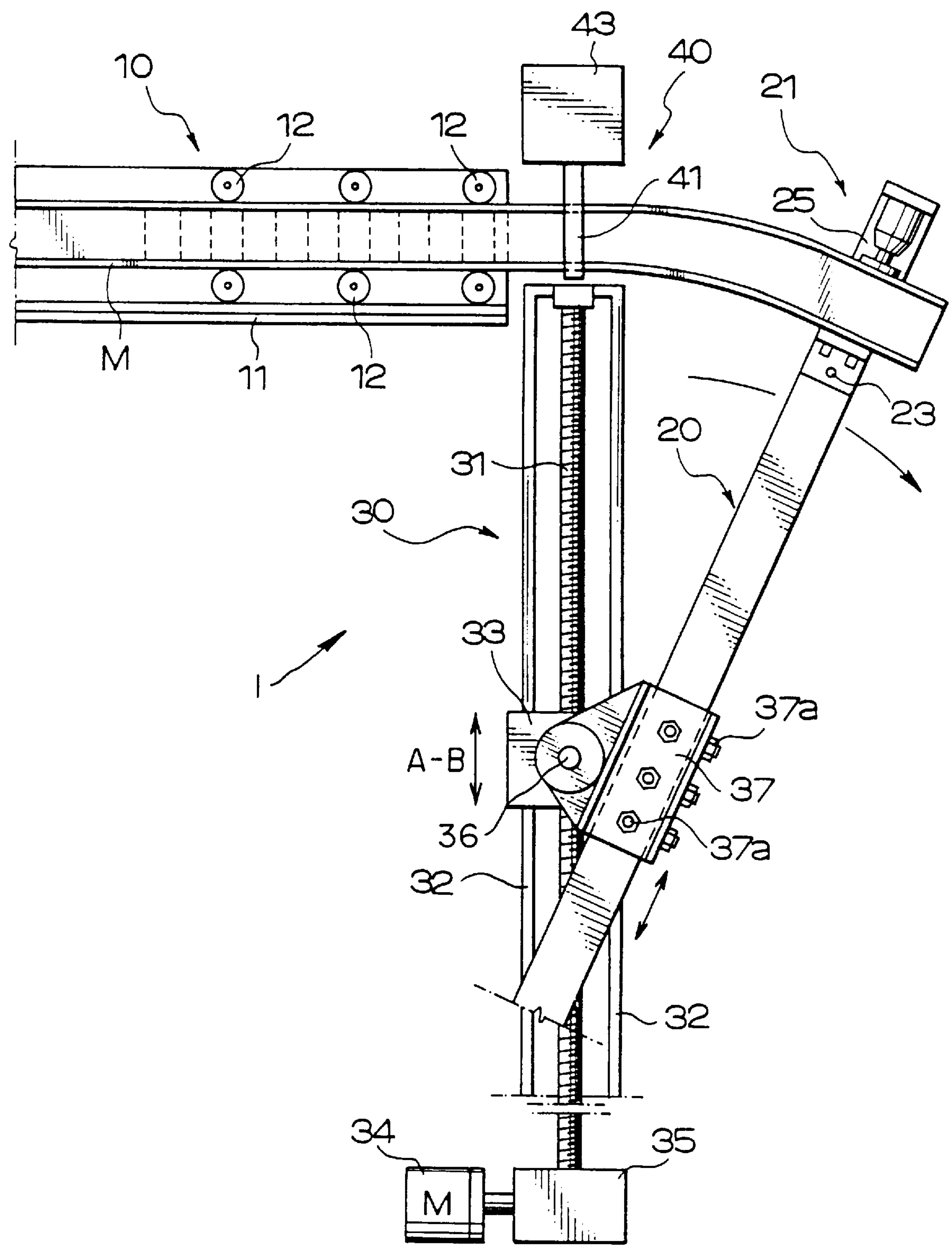
FIG. 1 is a plane view of an induction-heating bender according to the present invention.

Referring to FIG. 1, an induction-heating bender 1 comprises conveyor means 10 for feeding a beam-like workpiece M to be bent, a pivot arm 20 having a gripper 21 rotatably fixed at its free end for gripping the workpiece, an arm support 30 for rotatably holding the pivot arm 20 and for carrying the same toward the beam-like workpiece, and heating-and-cooling mechanism 40 for induction-heating and softening the beam-like workpiece and for cooling the same.

The feeding mechanism 10 is a conveyor 11 having a plurality of rolls 12 arranged on its opposite longitudinal sides for feeding an elongated workpiece to the bending station. The roll-to-roll width of the conveyor 11 can be adjusted to sandwich firmly the workpiece therebetween.

As described above, the gripper 21 is rotatably fixed to the free end of the pivot arm 20 for gripping the workpiece M. At the opposite end, the pivot arm 20 is rotatably fixed to the square arm support 30 via an associated arm holder 37, as later described.

The arm support 30 comprises two parallel guide rails 32, 32, a screw drive 31 arranged between the opposite guide rails 32, 32, and a carrier 33 movable on the screw drive 31 back and forth as indicated by arrow A–B. The screw drive 31 is connected to a motor 34 via an associated speed-reduction unit 35. The carrier 33 has a square arm holder 37 mounted rotatably about its upright axle or pivot 36. The distance between the axle 36 and the workpiece M can be controlled by rotating the motor 34.

The pivot arm 20 is inserted in the square holder 37 by loosening fastening bolts 37*a,* and then, it can be fastened to the square holder 37 by tightening the fastening bolts 37*a,* thereby permitting the pivot arm to be set at a desired pivot-to-gripper distance. As shown in the drawing, the upright axle or pivot 36 of the square holder 37 is offset from the longitudinal axis of the pivot arm 20 horizontally in the direction in which the workpiece travels.

Figure 2:
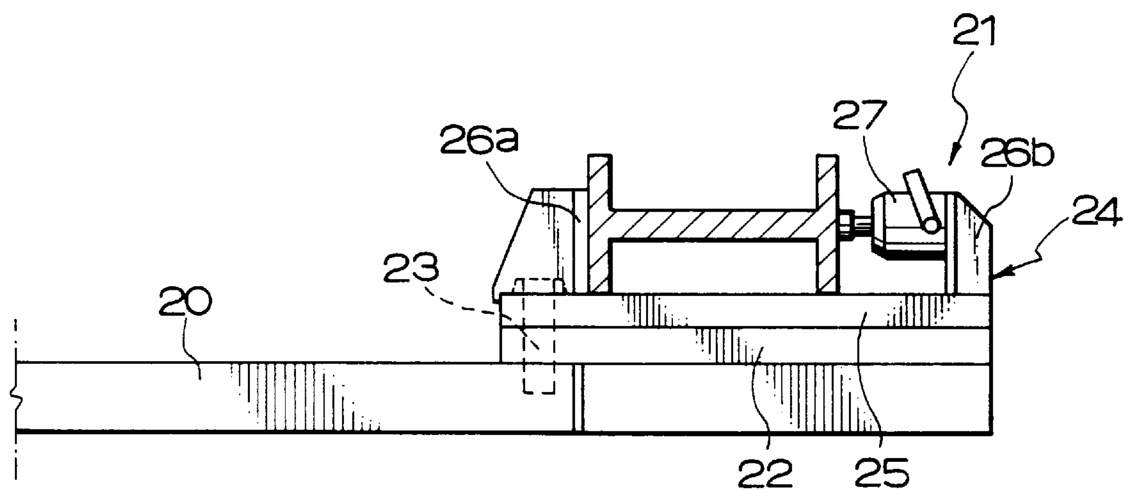
FIG. 2 is a side view of the gripping end of a pivot arm.
Figure 3:
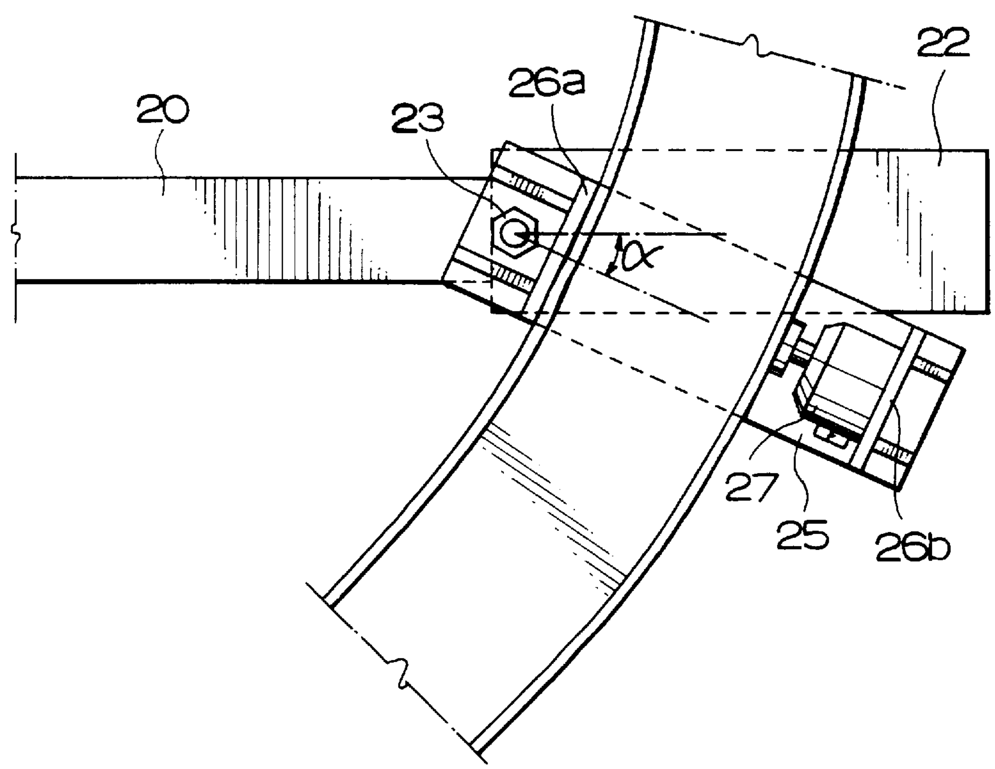
FIG. 3 is a plane view of the gripping end of the pivot arm.

Referring to FIGS. 2 and 3, the gripper 21 comprises a stationary table 22 fixed to the free end of the pivot arm 20 and a chuck device 24 rotatably fixed to the stationary table 22. The chuck device 24 comprises a turntable 25 rotatable about a stud pin 23, a pair of upright catch pieces 26*a* and 26*b* confronting in longitudinal direction on the turntable 25, and a manually-operated jack 27 fixed inside of the upright catch piece 26*b*. The workpiece M can be gripped between the confronting catch pieces 26*a* and 26*b* with the aid of the manually-operated jack 27.

The manually-operated jack 27 may be replaced by a hydraulic jack, which can hold a workpiece with strong force. A power-operated jack comprising a motor drive and an associated speed-reduction unit may be used, which can hold a workpiece with still strong force.

Figure 4:
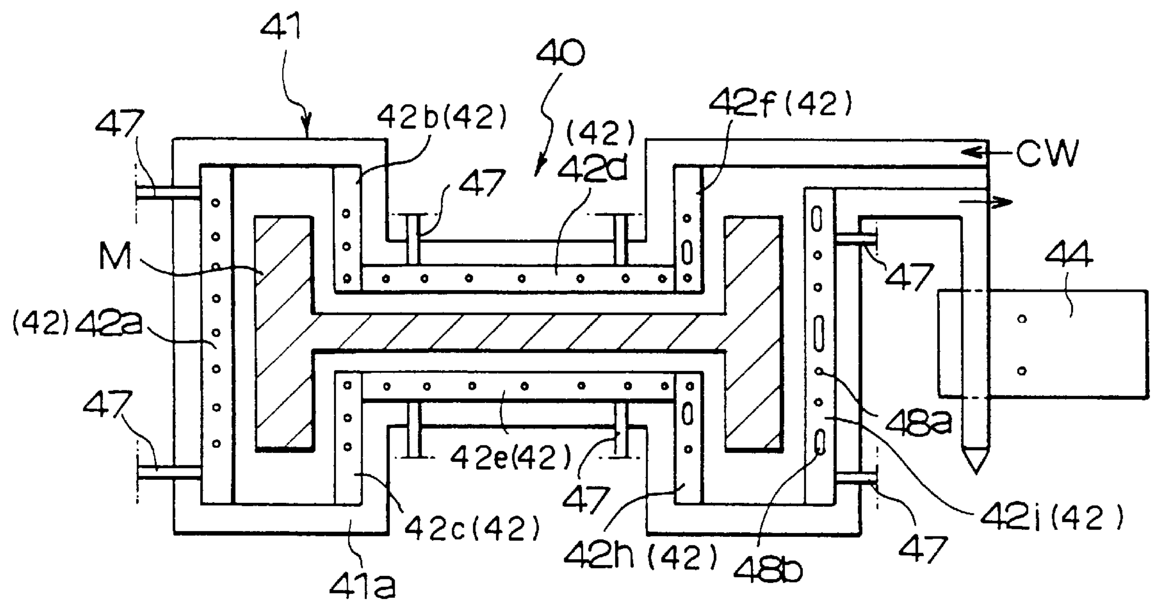
FIG. 4 is a sectional view of the heating-and-cooling mechanism of the bender.

Referring to FIG. 4, the heating-and-cooling mechanism 40 has a heating coil unit 41 to encircle a workpiece M. The heating coil unit 41 comprises an electric current carrying coil sub-unit 41*a* and a heating-and-cooling coil sub-unit 42, and a transformer 43 is connected to the heating-and-cooling coil unit 41 for feeding it with a high-frequency energy ranging from 50 to 900 kW. When a metal workpiece is inserted in the heating-and-cooling coil unit 41, it can be induction-heated by inducing alternate magnetic flux by alternate current, thereby causing eddy current to appear at an increased density in the workpiece, and hence causing Joule heat on the surface of the workpiece. When the workpiece is heated up to its recrystallization temperature, it can be bent with a relatively small force. In FIG. 4 the workpiece M is shown as an H-steel, and the heating-and-cooling coil unit 41 is so shaped as to permit insertion of the H-steel, and is supported by an associated support arm 44.

Figure 5:
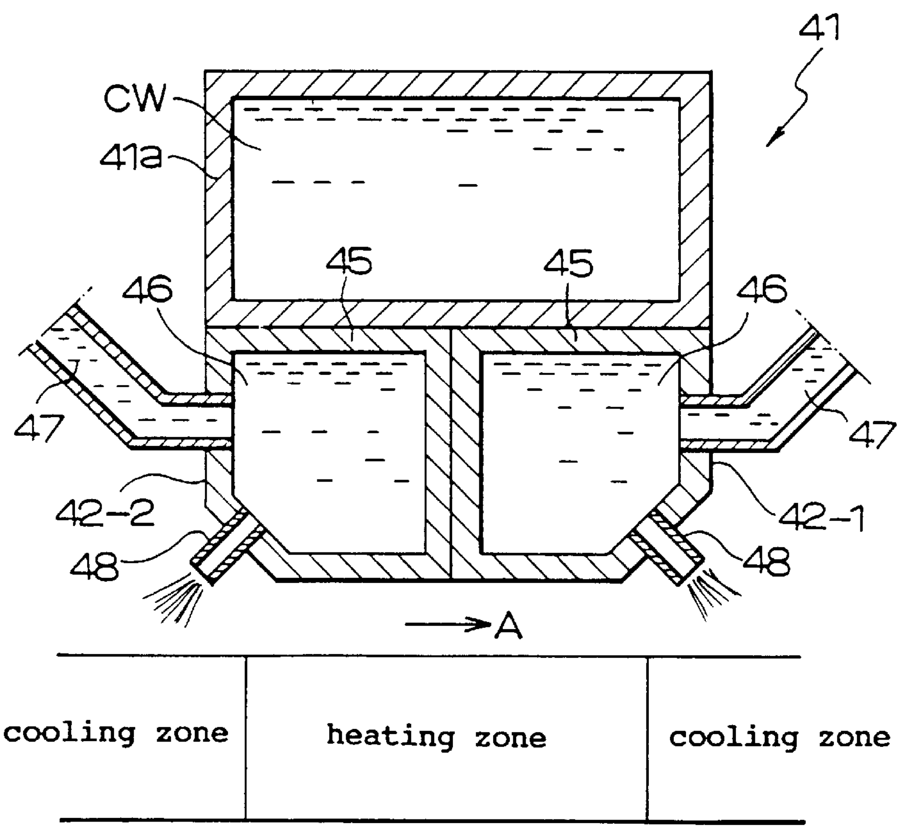
FIG. 5 is a sectional view of a selected portion of the heating-and-cooling mechanism of the bender.

Referring to FIG. 5, the electric current carrying coil sub-unit 41*a* has a rectangular space inside, permitting cooling water CW to flow therein, thereby preventing the electric current carrying coil sub-unit 41*a* from rising to the destructive temperature. The heating-and-cooling coil sub-unit 42 is laid on the inner surface of the electric current carrying coil sub-unit 41*a* (facing the workpiece M). In this particular embodiment the heating-and-cooling coil sub-unit 42 is composed of eight divisional sections 42*a–f* and 42*h–i* (see FIG. 4), each comprising two adjacent heating coil portions 45 and two cooling compartments 46 delimited thereby (see FIG. 5). Each cooling compartment 46 is equipped with a coolant pipe 47 for feeding the compartment 46 with water or air. Thus, the divisional sections 42*a–f* to 42*h–i* can be fed with different coolants at independently controlled temperature.

As seen from FIG. 5, the electric current carrying coil sub-unit 41*a* has two separate heating-and-cooling coil sections 42-1 and 42-2 adjoining in the direction A in which the workpiece travels. Each heating-and-cooling coil section 42-1 or 42-2 comprises a heating coil portion 45 and a cool compartment 46, which is equipped with a coolant ejection nozzle 48. The opposite coolant ejection nozzles 48 of the adjoining cool compartments 46 are a predetermined distance apart from each other, delimiting the heating zone between the opposite coolant ejection nozzles 48, and the cooling zones at the opposite coolant ejection nozzles 48 for the workpiece M.

These coolant ejection nozzles 48 can eject different coolants at different flow rates, as for instance, follows: water may be ejected from one of these coolant ejection nozzles 48 at the temperature of 40° C., and at the same time, air may be ejected from the other coolant ejection nozzle 48 below the temperature of 40° C., preventing the hardening of the workpiece.

Referring to FIGS. 6A to 6D, coolant slots may be formed in place of the ejection nozzles 48 as shown in FIG. 5. These coolant slots are of different shapes and sizes for controlling the flow rate of the coolant. A linear arrangement of relatively small circular apertures 48*a* is appropriate for ejecting the coolant at a decreased flow rate (see FIG. 6A). A linear arrangement of elongated slots 48*b* is appropriate for ejecting the coolant at an increased flow rate (see FIG. 6B). An alternate, linear arrangement of circular apertures and elongated slots may be used for ejecting the coolant at controlled flow rate (see FIGS. 6C and D).

Referring to FIG. 4 again, the divisional sections 42*i,* 42*f* and 42*h* of the heating-and-cooling coil sub-unit 41 for heating and cooling the inner flange of the H-steel have circular apertures 48*a* and elongated slots 48*b* made for rapid cooling whereas the divisional sections 42*a,* 42*b* and 42*c* of the heating-and-cooling coil sub-unit 41 for heating and cooling the outer flange of the H-steel have circular apertures 48*a* made for slow cooling. The cooling of each flange at different temperatures permits the wrinkle-free bending of the H-steel.

FIG. 7 shows a heating-and-cooling mechanism 50 appropriate for use in bending a square pipe 51. It comprises a square-shaped, electric current carrying coil unit 52 and a heating-and-cooling coil unit 53, which is composed of divisional sections 53*a* to 53*d* each capable of supplying different coolants such as water and air at controlled temperature. These cooling factors may be selected in consideration of stretch or stress which are supposed to appear in the workpiece.

FIG. 8 shows a heating-and-cooling mechanism 60 appropriate for use in bending a triangular pipe 61. It comprises a triangular, electric current carrying coil unit 62 and a heating-and-cooling coil unit 63, which is composed of divisional sections 63*a* to 63*c* each capable of supplying different coolants such as water and air at controlled temperature. These cooling factors may be selected in consideration of stretch or stress which are supposed to appear in the workpiece.

Figure 9:
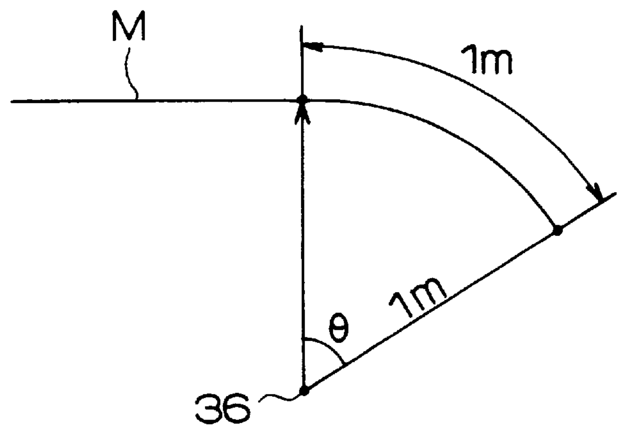
FIG. 9 illustrates how a selected section of a beam-like workpiece can be bent to give a one-meter long arc at one-meter long radial distance.
Figure 10:
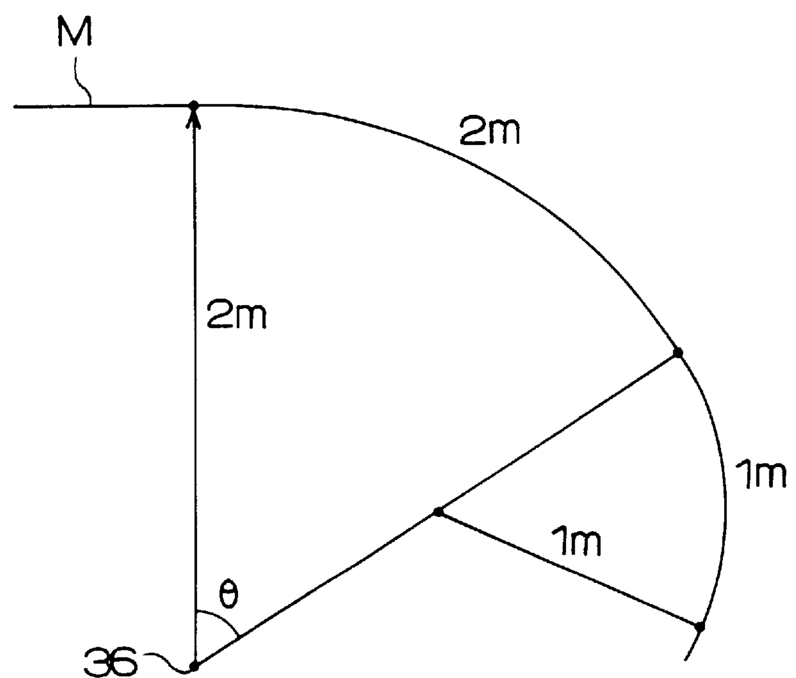
FIG. 10 illustrates how a subsequent selected section of the beam-like workpiece can be bent to give a two-meter long arc at two-meter long radial distance.
Figure 11:
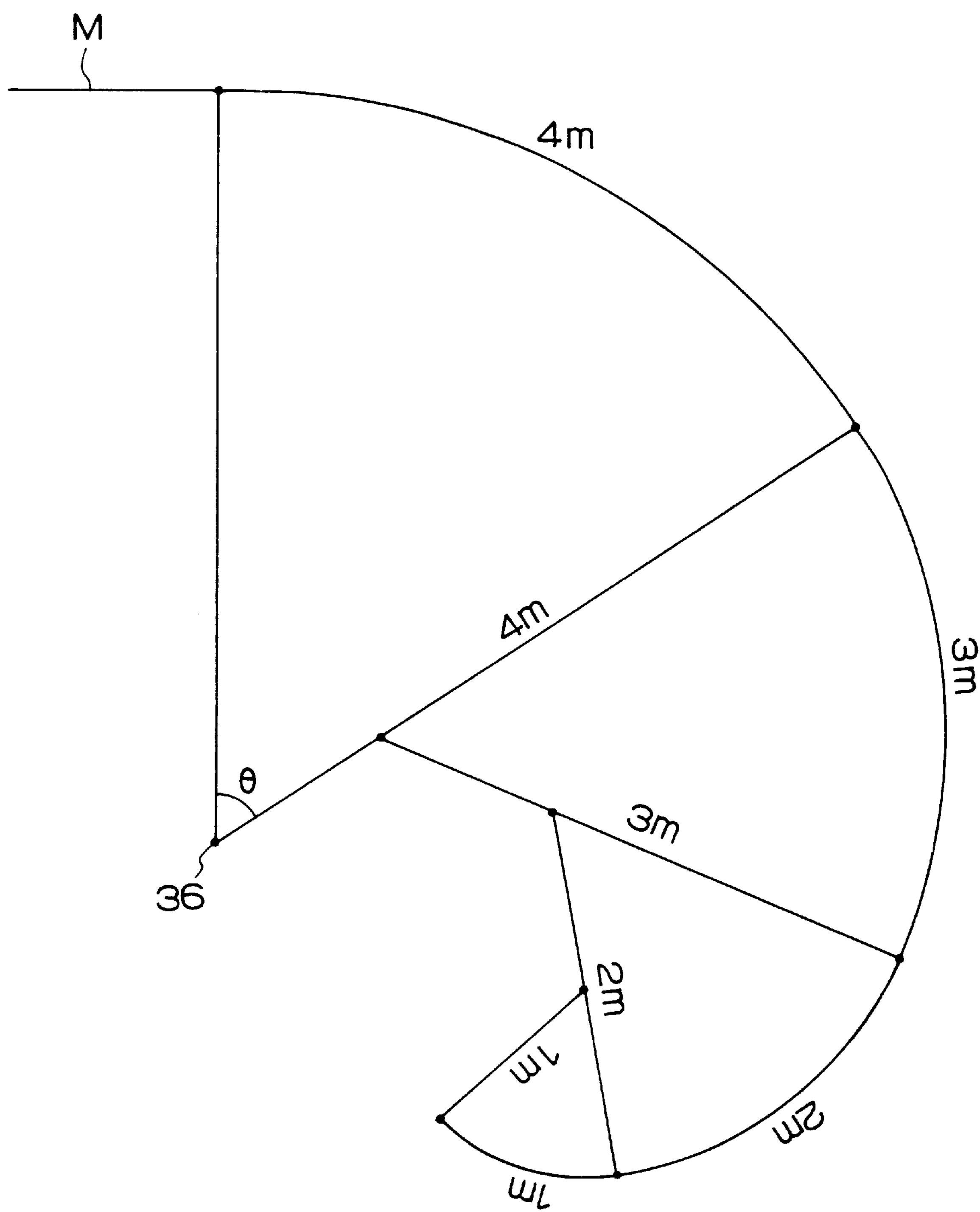
FIG. 11 illustrates how sequential sections of the elongated workpiece can be bent to give different curvatures to provide a spiral form.

Referring to FIGS. 9 to 11, the manner in which such an induction-heating bender is used in bending one, two, three and four meter-long sections of a beam-like workpiece sequentially at one, two, three and four meter-long radial distances respectively is described. First, the fastening bolts 37*a* of the square holder 37 are loosened, and then the motor 34 is made to start rotating, thereby rotating the screw drive 31 to move the carrier 33 and the square holder 37 until they are one meter apart from the center of the heating-and-cooling mechanism 41 (see FIGS. 1 and 9). The fastening bolts 37*a* of the square holder 37 are tightened to hold firmly the pivot arm 20. The jack 27 is operated to sandwich the end of the workpiece M between the opposite catch pieces 26*a* and 26*b*. Then, the heating-and-cooling mechanism 41 is supplied with the energy of high-frequency for heating. At the same time the conveyor 11 moves the workpiece M forward slowly while being heated by eddy currents.

Thanks to the offsetting of the longitudinal axis from the pivot of the pivot arm 20 in the travelling direction of the workpiece the stretch to which the workpiece is subjected is decreased accordingly, thereby allowing the bending length of workpiece to vary continuously. In FIG. 9 the rotary angle $\theta$ of the pivot arm 20 is calculated to be 57.32 degrees from the following equation: $2\pi\times\theta\div360=1$.

Referring to FIG. 10, the manner in which the subsequent two meter-long section is bent at two meter-long radial distance is described. First, the pivot arm 20 is returned to the initial position in which the pivot arm 20 is parallel to the arm support 30, and the fastening bolts 37*a* of the square holder 37 are loosened. Then, the motor 34 is made to start rotating, thereby moving the carrier 33 two meters apart from the center of the heating-and-cooling mechanism 41. The turntable 25 of the gripper 21 is inclined at the angle $\alpha$ with respect to the longitudinal axis of the pivot arm 20 to be in conformity with the precedent, one meter-long section already bent (see FIG. 3). The fastening bolts 37*a* of the square holder 37 are tightened to hold firmly the pivot arm 20. While the workpiece is heated by the heating-and-cooling mechanism 41, the beam-like workpiece is fed forward by the conveyor 11, thereby allowing the beam-like workpiece to be bent. The turning of the turntable 25 in conformity with the precedent curved section of workpiece assures the smooth transition from the precedent to subsequent curved sections, which smooth transition cannot be attained simply by bending at different radial distances as is the case with the conventional bender. In FIG. 10 the rotary angle $\theta$ of the pivot arm 20 is calculated to be 57.32 degrees from the following equation: $4\pi\times\theta360=2$.

Likewise, sequential three meter-long and four meter-long sections are curved by bending at three meter-long and four meter-long radial distances (see FIG. 11). The sequential sections thus bent are continuous and smooth at their transitions.

In case that an elongated beam-like workpiece is bent to be in the form of "S" one half-length of elongated workpiece is bent into a semi-circular shape in the same way as described above with reference to FIGS. 9 to 11, and then, the elongated workpiece is turned back side front on the conveyor 11. The turntable 25 of the gripper 21 is aligned with the semicircular-to-linear transition of the elongated workpiece, and then it is firmly held by the gripper 21. Finally, the remaining half-length of the elongated workpiece is bent into another semi-circular shape, which is symmetrical with the precedent semi-circular shape with respect to the center of the elongated workpiece. Thanks to alignment of the turntable 25 relative to the remaining half-length a continuously varying "S"-shaped workpiece results.

Figure 12:
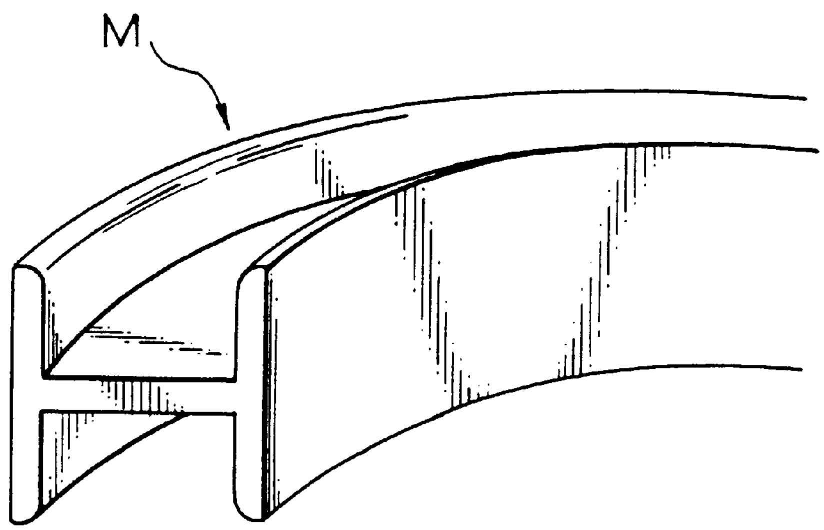
FIG. 12 is a perspective view of an H-steel bent by using an induction heating bender according to the present invention.
Figure 13:
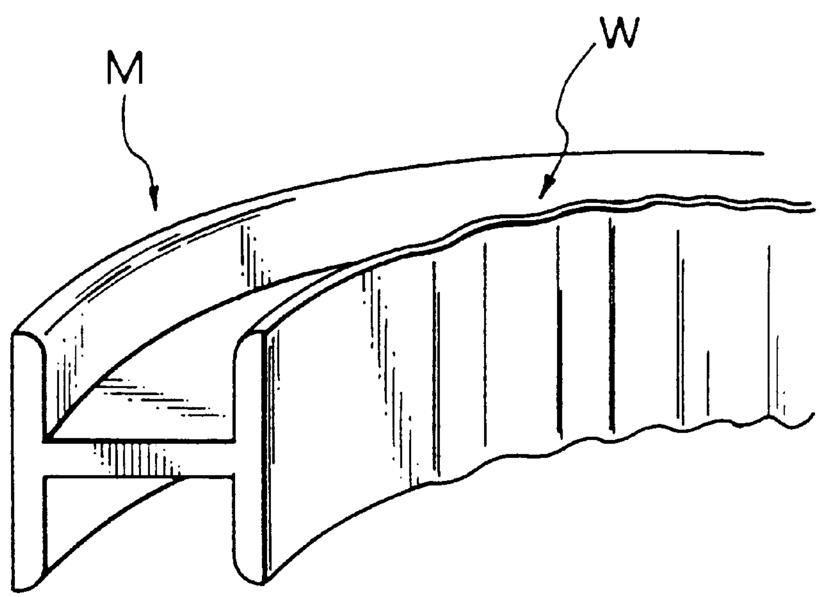
FIG. 13 is a similar perspective view of an H-steel bent by using a conventional induction heating bender.

The heating-and-cooling mechanism permits a workpiece to be heated and cooled at selected locations, thereby preventing appearance of wrinkles on the workpiece even if it is an "H"-steel (see FIGS. 12 and 13), which is known as being difficult in bending.

Workpieces which are bent by an induction-heating bender according to the present invention are found to have good mechanical characteristics and exact shape and size. An increased curvature can be attained easily. Also, the cooling can be easily controlled to meet particular kinds of workpieces, thereby expediting the required bending in compliance with the particular physical characteristics of workpieces. The induction-heating bender is described as being applied to the bending of an "H"-steel, a circular tube, a square tube and a triangular tube, but it can be equally applied to the bending of a polygonal tube, an elliptical tube, a semicircular tube or the like. Those skilled in the art will realize that a variety of modifications can be made without departing from the spirit of the present invention, which is defined in accompanying claims.

What is claimed is:

1. An induction-heating bender comprising:

means for feeding a workpiece to be bent;

a pivot arm having a gripper rotatably fixed at a free end to grip the workpiece to be bent, permitting the gripper to be set at a selected angle relative to an axial line of the pivot arm;

an arm support for rotatably holding the pivot arm and to carry the pivot arm toward the workpiece to be bent, permitting the pivot arm to be set at a controlled effective pivot-to-gripper distance; and a heating-and-cooling mechanism for induction-heating and softening the workpiece to be bent and for cooling the workpiece.

2. An induction-heating bender according to claim 1 wherein the pivot arm has the axial line offset from a pivot of the pivot arm.

3. An induction-heating bender according to claim 1 wherein the gripper has a manually-operated jack equipped therewith.

4. An induction-heating bender according to claim 1 wherein the gripper has a hydraulic jack equipped therewith.

5. An induction-heating bender according to claim 1 wherein the gripper has a power-driven jack equipped therein.

6. An induction-heating bender according to claim 1 wherein the heating-and-cooling mechanism comprises a heating coil encircling the workpiece to be bent and a plurality of cool compartments placed inside of the heating coil.

7. An induction-heating bender according to claim 6 wherein the heating-and-cooling mechanism further comprises at least one circular aperture and at least one elongate slot to cool the temperatures of the plurality of cool compartments independently.

8. An induction-heating bender according to claim 6 wherein each of the cool compartments comprises two separate sections adjoining in the direction in which the workpiece travels.

* * * * *